United States Patent
Petricci et al.

(10) Patent No.: US 9,683,151 B2
(45) Date of Patent: Jun. 20, 2017

(54) NON-AQUEOUS FLUOROPOLYMER COMPOSITIONS

(71) Applicant: SOLVAY SPECIALTY POLYMERS ITALY S.P.A., Bollate (IT)

(72) Inventors: Silvia Rita Petricci, Bresso (IT); Solange Barbieri, Baranzate (IT); Claudio Adolfo Pietro Tonelli, Paderno d'Adda (IT); Giuseppe Marchionni, Milan (IT)

(73) Assignee: SOLVAY SPECIALTY POLYMERS ITALY S.P.A., Bollate (MI) (IT)

( * ) Notice: Subject to any disclaimer, the term of this patent is extended or adjusted under 35 U.S.C. 154(b) by 0 days.

(21) Appl. No.: 14/652,095

(22) PCT Filed: Dec. 4, 2013

(86) PCT No.: PCT/EP2013/075470
§ 371 (c)(1),
(2) Date: Jun. 12, 2015

(87) PCT Pub. No.: WO2014/090646
PCT Pub. Date: Jun. 19, 2014

(65) Prior Publication Data
US 2015/0322313 A1    Nov. 12, 2015

(30) Foreign Application Priority Data
Dec. 13, 2012  (EP) .................... 12196997

(51) Int. Cl.
| | | |
|---|---|---|
| C08L 71/00 | (2006.01) |
| C09J 175/08 | (2006.01) |
| C08K 5/05 | (2006.01) |
| C08G 18/50 | (2006.01) |
| C08G 18/75 | (2006.01) |
| C08G 18/08 | (2006.01) |
| C08G 18/10 | (2006.01) |
| C08G 18/24 | (2006.01) |
| C09D 175/08 | (2006.01) |
| C08L 71/02 | (2006.01) |

(52) U.S. Cl.
CPC ........ *C09J 175/08* (2013.01); *C08G 18/0814* (2013.01); *C08G 18/0823* (2013.01); *C08G 18/0852* (2013.01); *C08G 18/10* (2013.01); *C08G 18/246* (2013.01); *C08G 18/5015* (2013.01); *C08G 18/755* (2013.01); *C08K 5/05* (2013.01); *C09D 175/08* (2013.01); *C08L 71/00* (2013.01); *C08L 71/02* (2013.01)

(58) Field of Classification Search
None
See application file for complete search history.

(56) References Cited

U.S. PATENT DOCUMENTS

| | | | |
|---|---|---|---|
| 3,242,218 A | 3/1966 | Miller | |
| 3,715,378 A | 2/1973 | Sianesi et al. | |
| 5,149,842 A | 9/1992 | Sianesi et al. | |
| 5,258,110 A | 11/1993 | Sianesi et al. | |
| 5,498,457 A | 3/1996 | Ishihara et al. | |
| 5,798,409 A | 8/1998 | Ho | |
| 9,090,772 B2* | 7/2015 | Tonelli | C08G 18/5015 |
| 2014/0213720 A1* | 7/2014 | Tonelli | C08G 18/5015 524/539 |

FOREIGN PATENT DOCUMENTS

| | | |
|---|---|---|
| EP | 239123 A2 | 9/1987 |
| EP | 784641 B1 | 1/2002 |
| EP | 1559733 A1 | 8/2005 |
| GB | 1104482 A | 2/1968 |
| WO | 2007102993 A1 | 9/2007 |
| WO | 2010000715 A1 | 1/2010 |
| WO | 2010028226 A2 | 3/2010 |
| WO | 2011131547 A1 | 10/2011 |
| WO | 2013017470 A1 | 2/2013 |

* cited by examiner

*Primary Examiner* — Richard A Huhn

(57) ABSTRACT

The invention relates to a non-aqueous fluoropolymer composition comprising: a) at least one fluorinated ionizable polymer [polymer (A)] as defined in the description, and b) at least one fluorinated ionizable polymer [polymer (B)] as defined in the description; c) at least one fluorinated solvent; and d) at least one alcohol. The invention further relates to a process for manufacturing the composition and to the use of the composition for preparing polymeric materials.

16 Claims, No Drawings

NON-AQUEOUS FLUOROPOLYMER COMPOSITIONS

This application is a U.S. national stage entry under 35 U.S.C. §371 of International Application No. PCT/EP2013/075470 filed Dec. 4, 2013, which claims priority to European application No. 12196997.6 filed on Dec. 13, 2012.

TECHNICAL FIELD

The present invention relates to non-aqueous fluoropolymer compositions useful for the preparation of polymeric materials.

BACKGROUND ART

Fluoropolymer compositions containing fluoropolymers which comprise ionisable groups are known from the prior art.

For example, U.S. Pat. No. 5,498,457 (HITACHI) relates to a magnetic recording medium having a lubricant layer comprising ionically interbonded fluoropolyethers with acidic and basic terminal groups; preferably, each fluoropolyether has at least two acidic terminal groups or basic terminal groups in one molecule. According to a specific embodiment, the fluoropolyether containing acidic terminal groups complies with formula:

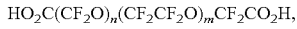

wherein m and n are integers, while the perfluoropolyether containing basic terminal groups complies with formula:

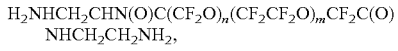

where m and n are integers. U.S. Pat. No. 5,498,457 does not disclose or suggests polymer mixtures based on fluoropolyethers containing recurring fluoropolyether blocks and recurring cationic or anionic blocks wherein at least one of the cationic or anionic blocks is between two fluoropolyether blocks.

WO 2010/000715 (SOLVAY SOLEXIS SPA) and WO 2008/138927 (SOLVAY SOLEXIS SPA) disclose compositions comprising at least a (per)fluoropolyether derivative which contains at least one fluorinated block and at least one urethane block of formula:

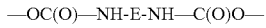

wherein E is a divalent hydrocarbon group, optionally comprising one or more aromatic rings. The fluorinated block may contain at least one functional block comprising at least one ionisable group, like a sulfonic acid group, a carboxy group or an amino group. These documents do not disclose or suggest compositions comprising (per)fluoropolyether derivatives with opposite charges, i.e. at least one (per)fluoropolyether derivative comprising fluorinated blocks containing at least one ionisable anionic group and at least one (per)fluoropolyether derivative comprising fluorinated blocks containing at least one ionisable cationic group in a defined ratio of ionic equivalents. Furthermore, these documents do not teach or suggest using the compositions for preparing materials endowed with elastic and/or self-healing properties.

WO 2007/102993 (3M INNOVATIVE PROPERTIES CO) relates to surface active block copolymers, their use in the manufacture of a foam composition and articles comprising the polymerised foam composition. The fluorinated block polymers comprise a (per)fluorinated block and may also contain functional blocks typically having one or more polar groups, such as carboxy, sulphonic or amino groups. Also this document does not specifically disclose or suggest compositions comprising block copolymers containing functional blocks having opposite charges in a defined ratio of ionic equivalents.

WO 2010/028226 (ARROWSTAR LLC) discloses compositions for imparting water and oil repellency to fibers, the compositions comprising a fluorinated polyurethane having a plurality of ionisable groups. This document discloses in particular a mixture of a cationic fluorinated polyurethane, namely Fluorolink® 5032 polyurethane, and an anionic fluorinated polyurethane, namely Fluorolink® P56 polyurethane; the compositions further comprise an acrylic polymer and are in the liquid form. Example 2, in particular, discloses an aqueous composition containing 8.8% by weight Fluorolink® 5032 polyurethane and 30.0% by weight Fluorolink® P56 polyurethane. From the Applicant's calculations, it appears that the two polymers are not present in a stoichiometric equivalent ratio of ionic groups with opposite charges. Indeed, the equivalent weight of Fluorolink® 5032 polyurethane is 0.25 eq/kg and the equivalent weight of Fluorolink® P56 polyurethane is 0.49 eq/kg; accordingly, in the compositions of example 2, the equivalent ratio between Fluorolink® 5032 polyurethane and Fluorolink® P56 polyurethane is calculated to be 0.2, while the equivalent ratio between Fluorolink® P56 polyurethane and Fluorolink® 5032 polyurethane is calculated to be 6.7.

This document does not teach or suggest replacing water in the preparation of the above compositions and it does not teach or suggest submitting the compositions to cross-linking in order to obtain self-healable and resistant compositions.

WO 2011/131547 (SOLVAY SOLEXIS SPA) relates to an aqueous composition comprising at least one fluorinated polymer (F), at least one functional hydrogenated polymer (H) and at least one cross-linking agent and to the use of the composition as coating, varnish or paint, wherein the ratio of the polymer (F) to polymer (H) is higher than 0.75. Non aqueous compositions are neither mentioned nor suggested.

U.S. Pat. No. 5,798,409, corresponding to EP 0784641 B (MINNESOTA MINING AND MANUFACTURING COMPANY) discloses both aqueous and non-aqueous two-part polyurethane compositions and optionally self-healable and scratch-resistant coatings prepared therefrom.

In particular, the non-aqueous composition comprises a part A and part B, wherein part A may comprise a urethane prepolymer which may contain carboxylic acid functional groups and which has a defined average hydroxyl functionality and a defined hydroxyl equivalent-weight, while Part B contains a cross-linker from the group consisting of polyisocyanates, blocked polyisocyanates, and mixtures thereof and an organic solvent. The NCO:OH ratio of Part B to Part A ranges from about 0.95:1 to about 1.07:1. These compositions are said to provide a PUR having excellent scratch resistance and self-healability (reference is made in particular to par. [0020]). However, this document neither discloses nor suggests to prepare compositions containing two fluorinated ionizable PUR polymers having opposite charges and it does not teach or suggest to submit such compositions to cross-linking.

WO 2013/017470 (SOLVAY SPECIALTY POLYMERS IT) discloses self-healing polymer compositions comprising:

a) at least one fluorinated ionisable polymer (A), which comprises recurring fluorinated blocks and recurring functional blocks, each of said recurring functional blocks comprising at least one ionisable anionic group, and in which polymer (A) at least one of the said recurring functional blocks is comprised between two fluorinated blocks;

b) at least one fluorinated ionisable polymer (B), which comprises recurring fluorinated blocks and recurring functional blocks, each of said recurring functional blocks comprising at least one ionisable cationic group, and in which polymer (B) at least one of the said recurring functional blocks is comprised between two fluorinated blocks;

wherein the ratio between the ionic equivalents of polymer (A) and the ionic equivalents of polymer (B) ranges from 1.1 to 0.9.

Polymers A and B can be ester, polyester, polyurethane or acrylate polymers.

The above compositions can be used for manufacturing articles like sealing agents, gaskets and membranes or for manufacturing coatings for substrates like leather, paper or cotton. Certain compositions wherein the (per)fluoropolyether chains in polymers (A) and (B) have similar molecular weight are rubber-like materials endowed with self-healing properties at room temperature, i.e. they possess an intrinsic ability to repair mechanical damages without melting and cooling.

Two alternative methods are disclosed in this application for the manufacture of the above compositions. The first one is a so-called dispersion precipitation method which comprises the following steps:

a) preparing a dispersion of at least one polymer (A) and a dispersion of at least one polymer (B) in water or in a mixture of water and an organic solvent;

b) mixing together the dispersion of polymer (A) and the dispersion of polymer (B) until complete precipitation of a solid polymer composition;

c) filtering off the precipitated solid polymer composition;

d) washing and drying the precipitated polymer composition.

The second one comprises hot mixing at least one polymer (A) and at least one polymer (B).

In fact, in the dispersion precipitation method, polymers (A) and (B) are used in the salified form; however, compositions obtained according to this method are contaminated by salts (usually triethylammonium chloride); this salt contamination has a negative impact on the swelling properties of the compositions in water. Furthermore, this method does not allow preparing stable dispersions which can be stored for a certain time period and used subsequently.

SUMMARY OF INVENTION

The applicant has now found out that it is possible to provide stable polymer dispersions containing block fluoropolymers having opposite charges by avoiding the use of water and by using at least one fluorinated solvent and at least one alcohol as solvent mixture. The dispersions are able to provide solid compositions endowed with high chemical and physical resistance and also with self-healing (or self-repairing) properties. Thanks to the use of the above solvent mixture, the dispersions are stable also when added with a cross-linking agent.

Thus, in a first aspect, the present invention relates to a non-aqueous fluoropolymer composition [composition (C)] comprising:

a) at least one fluorinated ionisable polymer [polymer (A)], which comprises recurring fluorinated blocks and recurring functional blocks, each of said recurring functional blocks comprising at least one ionisable anionic group, and wherein at least one of the said recurring functional blocks is comprised between two fluorinated blocks;

b) at least one fluorinated ionisable polymer [polymer (B)], which comprises recurring fluorinated blocks and recurring functional blocks, each of said recurring functional blocks comprising at least one ionisable cationic group, and wherein at least one of the said recurring functional blocks is comprised between two fluorinated blocks;

c) at least one fluorinated solvent and d) at least one alcohol.

In a second aspect, the invention relates to a process for preparing a non-aqueous fluoropolymer composition, said process comprising:

a) providing at least one fluorinated ionisable polymer [polymer (A)], which comprises recurring fluorinated blocks and recurring functional blocks, each of said recurring functional blocks comprising at least one ionisable anionic group, and wherein at least one of the said recurring functional blocks is comprised between two fluorinated blocks;

b) providing at least one fluorinated ionisable polymer [polymer (B)], which comprises recurring fluorinated blocks and recurring functional blocks, each of said recurring functional blocks comprising at least one ionisable cationic group, and wherein at least one of the said recurring functional blocks is comprised between two fluorinated blocks;

c) mixing polymer (A) and polymer (B) in at least one fluorinated solvent and at least one alcohol.

In a third aspect, the invention relates to sealing agents, gaskets, membranes, films and coatings obtained from composition [C].

In a fourth aspect, the invention relates to the use of composition [C] for the preparation of sealing agents, gaskets, membranes, films and coatings.

DEFINITIONS

For the purposes of the present description, the following definitions apply.

Fluorinated Blocks

The expression "recurring fluorinated blocks" means that a fluorinated block is repeated in the polymer structure; likewise, the expression "recurring functional blocks" means that the functional blocks are repeated in the polymer structure; according to one aspect of the invention, fluorinated blocks alternate with functional blocks.

The expression "fluorinated block" preferably denotes a (per)fluoropolyether block comprising a (per)fluoropolyoxylakylene chain [herein after also referred to as ($R_{OF}$) chain] which comprises, preferably consists of, recurring units having at least one catenary ether bond and at least one fluorocarbon moiety; typically, the ($R_{OF}$) chain comprises one or more randomly distributed repeating units R°, which are selected from the following groups:

$$-CFXO-, \text{ wherein X is F or } CF_3; \quad (i)$$

$$-CF_2CFXO-, \text{ wherein X is F or } CF_3; \quad (ii)$$

$$-CF_2CF_2CF_2O-; \quad (iii)$$

$$-CF_2CF_2CF_2CF_2O-. \quad (iv)$$

Preferably, the repeating units are selected from —$CF_2O$— and —$CF_2CF_2O$— units in a molar ratio ranging preferably from 0.1 to 10, more preferably from 0.5 to 5.

Functional Blocks

A functional block is a moiety which comprises one ionisable group and, optionally one or more reactive groups.

A "functional block comprising at least one ionisable anionic group" according to the present invention comprises, preferably consists of, a hydrocarbon chain [hereinafter referred to as chain ($R_H$)], optionally comprising one or more aromatic, heteroaromatic, cycloaliphatic or heterocycloaliphatic groups, said chain ($R_H$) comprising at least one functional group which, under appropriate pH conditions, forms an anionic group bearing one ore more negative charges.

A "functional block comprising at least one ionisable cationic group" comprises, preferably consists of, a hydrocarbon chain [hereinafter referred to as chain ($R_H$)], optionally comprising one or more aromatic, heteroaromatic, cycloaliphatic or heterocycloaliphatic groups, said chain ($R_H$) comprising at least one functional group which, under appropriate pH conditions, forms a cationic group bearing one ore more positive charges. In the present description, these functional blocks can be also referred to as "ionisable anionic blocks" and "ionisable cationic blocks" or "anionic blocks" and "cationic blocks" respectively, or can be referred to together as "ionisable blocks".

Ionisable Groups

An "ionisable anionic group" is a functional group which, under appropriate pH conditions, forms an anionic group bearing one or more negative charges and an "ionisable cationic group" is a functional group which, under appropriate pH conditions, forms a cationic group bearing one or more positive charges.

Fluorinated Solvent

A fluorinated solvent is a hydrocarbon or aromatic solvent containing one or more fluorine atoms and, optionally, one or more oxygen atoms. Preferably, the fluorinated solvent is selected from hydrofluoroethers (HFEs), hydrofluoropolyethers (HFPE), hexafluoroxylene and mixtures of two or more of these solvents. Examples of suitable HFEs are those known as Novec® fluids, available from 3M, while examples of HFPEs are known as H-Galden® HFPEs.

Alcohol

The term alcohol includes aliphatic straight or branched alcohols containing from 2 to 6 carbon atoms. Preferably, the alcohol is selected from ethanol, n-propanol and isopropanol; more preferably, the alcohol is isopropanol.

DETAILED DESCRIPTION

Compositions

The compositions of the invention contain a polymer (A) and a polymer (B) as defined above in such an amount as the equivalent ratio between the ionic equivalents of polymer (A) and the ionic equivalents of polymer (B) is either 1:1 or higher or lower than 1:1; in the following, compositions wherein the ratio is higher or lower than 1:1 will also referred to as "unbalanced compositions [C]". In compositions [C], the ionic groups in polymer (A) and the ionic groups in polymer (B) give rise to an ionically interconnected polymer network. Unbalanced compositions [C] offer the advantage that free ionisable groups are still present on either polymer (A) or on polymer (B); these groups can be submitted to cross-liking reactions, in order to form a tighter polymer network. Among unbalanced compositions [C], those in which the (A):(B) ionic equivalent ratio or (B):(A) ionic equivalent ratio is at least of 1:1.25 are preferred. Unbalanced compositions [C] in which the equivalent ratio between the ionic equivalents of anionic polymer (A) and the ionic equivalents of cationic polymer (B) is higher than 1:1, preferably higher than 1.25:1 are particularly preferred.

In the compositions of the invention, the overall amount of polymer (A) and polymer (B) with respect to the overall amount of solvents and the weight ratio between the fluorinated solvent and the alcohol will be selected according to the polymers and solvents in such a way as to obtain compositions having a suitable fluidity for casting or moulding processes carried out for obtaining polymeric materials.

For example, as far as the solvents are concerned, if Novec® 7500 HFE and isopropanol are used, their weight ratio typically ranges from 1:1 to 10:1.

Preparation of the Compositions of the Invention

Compositions [C] can be conveniently prepared by a process which comprises:

a) providing at least one fluorinated ionisable polymer [polymer (A)], which comprises recurring fluorinated blocks and recurring functional blocks, each of said recurring functional blocks comprising at least one ionisable anionic group, and wherein at least one of the said recurring functional blocks is comprised between two fluorinated blocks;

b) providing at least one fluorinated ionisable polymer [polymer (B)], which comprises recurring fluorinated blocks and recurring functional blocks, each of said recurring functional blocks comprising at least one ionisable cationic group, and wherein at least one of the said recurring functional blocks is comprised between two fluorinated blocks;

c) mixing polymer (A) and polymer (B) in at least one fluorinated solvent and at least one alcohol.

The amounts of polymers (A) and (B) will be selected in such as way as to obtain the desired ionic equivalent ratio.

The expression "mixing polymer (A) and polymer (B) in at least one fluorinated solvent and at least one alcohol" means that polymers (A) and (B) and the solvents are mixed with, or added to each other in any order. Preferably, polymer (A) and polymer (B) are added to the solvent mixture at a temperature ranging from room temperature to a temperature at least 10° C. lower that the boiling temperature of the lowest-boiling solvent in the mixture. Usually, when isopropanol is used as solvent, the temperature does not exceed 60° C. Mixing can be carried out according to conventional techniques, typically with magnetic or mechanical stirring. Mixing is continued until a dispersion of polymer (A) and (B) in the solvent is obtained. In unbalanced compositions [C], i.e. those in which the equivalent ratio between the ionic equivalents of polymer (A) and the ionic equivalents of polymer (B) is higher or lower than 1:1, a cross-linking agent (cross-linker) can be added in an equivalent amount ranging from 10 to 100% with respect to the equivalents of ionisable groups that are present in excess in the composition. Indeed, as anticipated above, it has been observed that when a cross-linking agent is added to such compositions, the chemical resistance of the polymeric material obtained from the compositions increases.

A cross-linking agent can be selected, for example, from epoxysilanes and epoxyacrylates, epoxysilanes being preferred.

Usually, when a silane compound is added as cross-linker, cross-linking is accomplished by submitting the compositions to hydrolysis and heating. Instead, when an acrylate cross-linker is added, cross-linking is usually accomplished photochemically.

Exemplary epoxysilanes comply with formula (Epo-sil-I) here below:

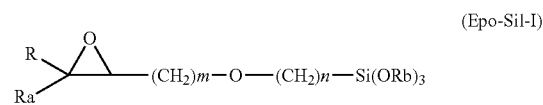

(Epo-Sil-I)

wherein R and $R_a$, independently from each other, are selected from hydrogen, straight or branched $C_1$-$C_4$ alkyl, m and n are integers selected from 1 to 10 and $R_b$ is $C_1$-$C_4$ alkyl.

An example of preferred compound of formula (I) is that in which R and Ra are both hydrogen, m is 1, n is 3 and Rb is methyl. This compound is available from Evonik Degussa GmbH with the tradename Dynasylan® GLYMO.

When epoxysilanes are used as cross-linkers, a tetraalkyl orthosilicate, typically tetraethyl orthosilicate $Si(OC_2H_5)_4$ (TEOS), can be used in order increase the cross-linking density. Indeed, in the presence of water, ORb groups hydrolyse to silanol groups which react with TEOS, giving rise to cross-linked structures comprising recurring —Si—O—Si— units.

When a cross-linking agent is added to compositions wherein the ratio between the ionic equivalents of anionic polymer (A) and the cationic equivalents of polymer (B) is higher than 1:1, preferably higher than 1:1.25, a catalyst is also added in an amount ranging from 1 to 10% mol with respect to the cross-linker. Organic bases like imidazoles have proven very effective catalysts in these reactions; a preferred example of imidazole catalyst is 2-ethyl-4-methylimidazole. Other suitable catalysts are metal salts and metal oxides and alkali salts of weak acids.

Exemplary epoxyacrylates comply with formula (Epo-Acryl-I) here below:

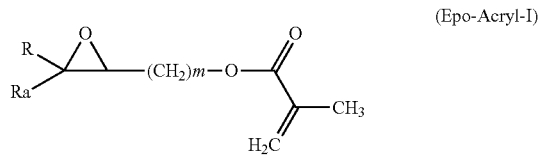
(Epo-Acryl-I)

wherein R, Ra and m are as defined above. A preferred example of Epo-Acryl-I is glycidylmethacrylate, complying with formula:

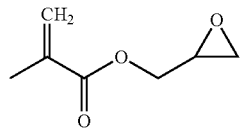

A suitable photoinitiator is added to the reaction mixture in an amount typically ranging from 1 to 10% with respect to the weigth of the neat curable composition. Examples of photoinitiators are benzophenone, 2-hydroxy-4'-(2-hydroxyethoxy)-2-methylpropiophenone, 1-hydroxycyclohexyl phenyl ketone.

A preferred example of photoinitiator is 2-hydroxy-2-methyl-1-phenyl-propan-1-one, available, for instance from Ciba under the trade name Darocur® 1173.

An additional acrylate compound can be used in order increase the cross-linking density in a suitable amount with respect to the Epo-Acryl-I. Examples of such additional acrylates are alpha,omega-diacrylates like tripropylene glycol diacrylate and 1,6-hexanediol diacrylate or polyol acrylates like trimethylolpropane triacrylate.

Preparation of Polymeric Materials from Compositions [C]

Compositions [C] are endowed with high stability and have the advantage that they can be stored in the liquid form before being subjected to further treatments or uses. Compositions [C] can be conveniently used for the preparation of polymeric materials. Typically, polymeric materials prepared from compositions [C] are amorphous materials endowed with elastic properties (softness and deformability) and are typically in the form of sealing agents, gaskets, membranes, films and coatings.

These polymeric materials are typically prepared by film-casting or moulding and drying a composition [C] according to methods known in the art.

These polymeric materials are endowed with high chemical stability and with improved mechanical properties. In particular, it has been observed that certain polymeric materials prepared from compositions [C] are endowed with self-healing (or self-repairing) properties.

Preferred Polymers to be Used in Compositions [C]

In a first preferred embodiment, compositions [C] comprise polyurethane polymers (PU polymers), i.e. polymers wherein the fluorinated blocks, preferably (per)fluoropolyether blocks, and the functional blocks are linked together by urethane moieties of formula (I) below:

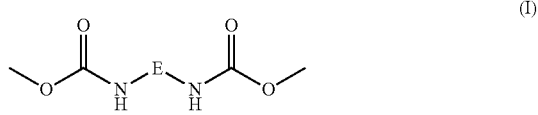
(I)

wherein E is a divalent hydrocarbon group, linear or branched, typically a $C_1$-$C_{12}$ hydrocarbon group, optionally comprising one or more cycloaliphatic, heterocycloaliphatic, aromatic or heteroaromatic groups, typically $C_3$-$C_{12}$ cycloaliphatic, $C_3$-$C_{12}$ heterocycloaliphatic, $C_5$-$C_{12}$ aromatic or $C_5$-$C_{12}$ heteroaromatic groups. As examples of heteroaromatic groups phosphazene, triazine and triazole can be mentioned in particular.

According to a second preferred embodiment of the invention, the compositions comprise polymers wherein fluorinated blocks, preferably (per)fluoropolyether blocks and the functional blocks are linked together through a moiety of formula (II) below:

(II)

A preferred example of this second embodiment is represented by compositions comprising polyester (PE) polymers, i.e. polymers in which (per)fluoropolyether blocks and functional blocks are linked together through a moiety of formula (IIA):

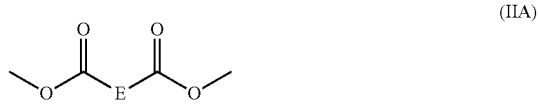
(IIA)

wherein E is as defined above.

A further preferred embodiment is represented by compositions containing polyacrylate polymers (PA polymers), i.e. polymers comprising blocks deriving from a PFPE acrylate, at least an acrylate and/or a 2-alkyl acrylate compound containing an ionisable anionic or cationic group or a precursor thereof and, optionally, a further non ionisable acrylate compound.

Chain ($R_{OF}$) in the (per)fluoropolyether block may advantageously comprise terminal bridging groups bound to the moiety of formula (I) or (II); such terminal bridging groups have formula —$CF_2CH_2(OCH_2CH_2)_{s'}$—, wherein s', equal or different at each occurrence, is 0 or an integer from 1 to 5. For the avoidance of doubt, the binding between the bridging group and the —OC(O)— group in the above moieties of formulae (I) and (II) above is depicted in the following scheme:

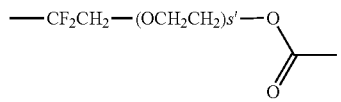

For the purposes of the present invention, suitable ionisable anionic groups are, for example, carboxylic acid groups of formula —COOH, sulphonic acid groups of formula —$SO_3H$, phosphoric acid groups of formula —$OPO_3H_4$, while suitable ionisable cationic groups are nitrogen-containing ionisable groups, such as amine groups, which may be either comprised in the chain ($R_H$) backbone, according to formula —N($R_N$)—, wherein $R_N$ is selected from H and hydrocarbon groups having 1 to 6 carbon atoms, or comprised in side groups having formula —N($R_{N1}$)($R_{N2}$), wherein $R_{N1}$ and $R_{N2}$, equal to or different from one another, are independently selected from hydrogen and hydrocarbon groups containing from 1 to 6 carbon atoms.

An exemplary chain ($R_H$) comprising an ionisable anionic group has formula ($R'_{HC}$):

chain ($R'_{HC}$)

wherein T is a trivalent hydrocarbon group selected from a linear or branched $C_1$-$C_{12}$ hydrocarbon chain, a $C_3$-$C_{12}$ cycloaliphatic, $C_3$-$C_{12}$ heterocycloaliphatic, $C_5$-$C_{12}$ aromatic or $C_5$-$C_{12}$ heteroaromatic group. In PU and in PE polymers, chain ($R'_{HC}$) can be selected in particular from any one of the followings:

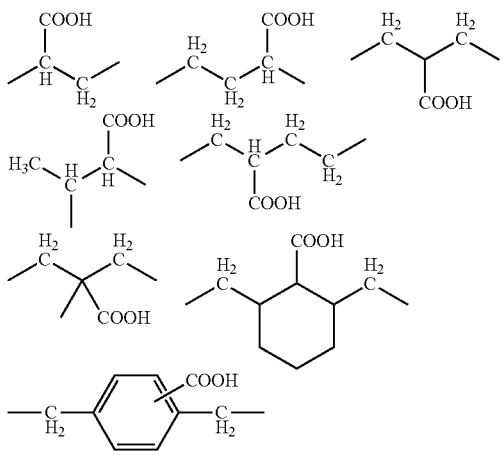

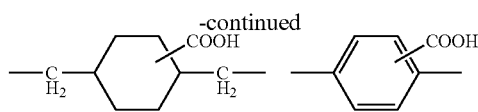

Chain ($R'_{HC}$) complying with formula:

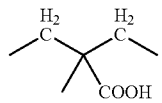

can be mentioned in particular.

In PA polymers, chain $R'_{HC}$ preferably complies with formula:

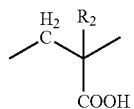

in which $R_2$ is H or a straight or branched $C_1$-$C_6$ hydrocarbon chain; more preferably, $R_2$ is hydrogen or methyl.

Preferably, a chain ($R_H$) comprising a ionisable group which forms a cationic group is an amine-containing chain of formula ($R''_{HC}$):

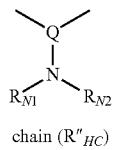

chain ($R''_{HC}$)

wherein $R_{N1}$ and $R_{N2}$ have the same meanings as defined above, Q is a trivalent hydrocarbon group selected from a linear or branched $C_1$-$C_{12}$ hydrocarbon chain, a $C_3$-$C_{12}$ cycloaliphatic, $C_3$-$C_{12}$ heterocycloaliphatic, $C_5$-$C_{12}$ aromatic or $C_5$-$C_{12}$ heteroaromatic group. In PU polymers and in PE polymers, chain ($R''_{HC}$) preferably complies with formula:

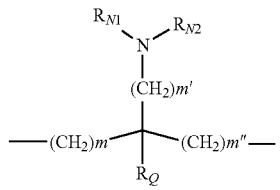

wherein $R_{N1}$ and $R_{N2}$ have the same meanings as defined above; more preferably, $R_{N1}$ and $R_{N2}$ are independently selected from linear or branched $C_1$-$C_4$ alkyl groups; m, m' and m" are 0 or a integers from 1 to 4, with the proviso that at least one of m and m" is not zero and $R_Q$ is H or a linear or branched $C_1$-$C_4$ alkyl group. Preferred amine-containing chains ($R''_{HC}$) are those of formulae —CH($CH_2$—N($C_2H_5$)$_2$)—$CH_2$— and —CH($CH_2$—N($CH_3$)$_2$)—$CH_2$—.

In PA polymers, chain ($R''_{HC}$) preferably complies with formula:

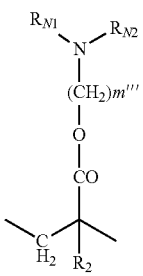

in which $R_{N1}$, $R_{N2}$ and $R_2$ are as defined above, while m''' is an integer ranging from 1 to 6. In a more preferred aspect, $R_{N1}$, $R_{N2}$ and $R_2$ are methyl and m''' is 2.

According to a further preferred aspect, in PU and PE polymers, a chain ($R_H$) comprising a ionisable group which forms a cationic group under appropriate pH conditions is an amine-containing chain of formula ($R'''_{HC}$):

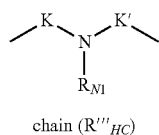

chain ($R'''_{HC}$)

wherein $R_{N1}$ has the same meanings defined above; preferably, $R_{N1}$ is selected from $C_1$-$C_4$ alkyl groups and K and K' are divalent hydrocarbon groups having from 1 to 6 carbon atoms.

In PU and PE polymers, the divalent hydrocarbon group E is preferably selected from:

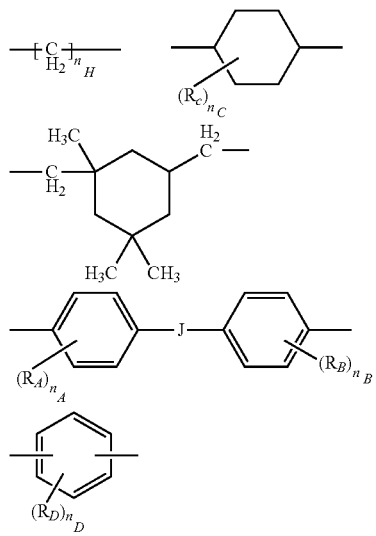

and mixtures thereof;
wherein:
$n_H$ is an integer from 1 to 12, preferably equal to 6;
J is a divalent bridging group selected from: a single bond; a methylene group (—$CH_2$—); an oxygen atom (—O—); a —$C(CH_3)_2$— group; a —$C(CF_3)_2$— group; a —$SO_2$— group; a —$C(O)$— group; preferably J is a methylene group;
each of $R_A$, $R_B$, $R_C$ and $R_D$, equal or different at each occurrence, is independently a halogen atom (e.g. Cl, Br, F), a $C_1$-$C_6$ hydrocarbon group (e.g. methyl, ethyl), a substituent group like notably —$OR_H$, —$NR_H R_{H'''}$, —$C(O)$—$R_{H''''}$, wherein $R_H$, $R_{H'}$, $R_{H''}$ and $R_{H'''}$, equal to or different from each other, are independently at each occurrence a hydrogen atom or a $C_1$-$C_6$ hydrocarbon group;
$n_A$, $n_B$ and $n_D$ are independently 0 or integers comprised between 1 and 4;
$n_C$ is 0 or an integer comprised between 1 and 10.

Synthesis of PU and PE Polymers

PU and PE polymers to be used in the compositions of the invention can be synthesised by reacting at least one hydroxy-terminated (per)fluoropolyoxyalkylene and at least one functionalised diol comprising at least one ionisable anionic or cationic group with at least one diisocyanate or at least one dicarboxylic acid, optionally in the presence of one or more chain-extenders or comonomers.

In greater detail, the synthesis can be performed by reacting:

a) at least one hydroxy-terminated (per)fluoropolyoxyalkylene complying with formula (V) here below:

$$Z\text{—}O\text{—}R_{OF}\text{—}Y \text{ of formula} \quad (V)$$

wherein $R_{OF}$ is as defined above and Z and Y, equal to or different from each other, are independently functional hydroxyl groups complying with formula —$CF_2CH_2O(CH_2CH_2O)_{s'}H$, wherein s', equal or different at each occurrence, is 0 or an integer comprised between 1 and 5;

b) at least one functionalized diol comprising at least one ionisable group, having formula HO—$R_H$—OH, wherein $R_H$ has the same meanings as defined above; and c) at least one diisocyanate of formula OCN-E-NCO or at least a dicarboxylic acid of formula HOOC-E-COOH or a reactive derivative thereof, wherein E is as defined above;

d) optionally, one or more chain extenders or comonomers with a molecular weight of 60 to 450 g/mol selected from diols of formula HO—$R_{diol}$—OH and/or diamines of formula $H_2N$—$R_{diamine}$—$NH_2$, wherein $R_{diol}$ and $R_{diamine}$ are straight or branched $C_2$-$C_{14}$ hydrocarbon groups, optionally containing non-salifiable functional groups, such as hydroxyl or amino groups. If a diamine $H_2N$—$R_{diamine}$—$NH_2$ is used, polyurethane/urea polymers or polyester/polyamido polymers are obtained, depending on whether a diisocyanate OCN-E-NCO or a dicarboxylic acid HOOC-E-COOH is used. Furthermore, if $R_{diol}$ or $R_{diamine}$ in optional chain extenders HO—$R_{diol}$—OH and $H_2N$—$R_{diamine}$—$NH_2$ contain non-salifiable functional groups, like hydroxyl or amino groups, such groups may react with functional groups optionally present on the E moiety of diisocyanate OCN-E-NCO or acid HOOC-E-COOH, giving rise to polymeric networks.

For the purposes of the present description, a reactive derivative of a dicarboxylic acid of formula HOOC-E-COOH is, for example, an acyl halide selected from acyl fluoride, chloride, bromide or iodide or an alkyl ester, typically a $C_1$-$C_4$ straight or branched alkyl ester.

The hydroxy-terminated (per)fluoropolyoxyalkylenes of formula (V) here above can be prepared starting from the corresponding (per)fluoropolyoxyalkylenes having —COF end groups as taught in GB 1104482 (MONTEDISON SPA) Feb. 28, 1968, U.S. Pat. No. 3,715,378 (MONTEDISON SPA) Feb. 6, 1973, U.S. Pat. No. 3,242,218 (DUPONT) Mar. 22, 1996, EP 239123 A (AUSIMONT SPA) Sep. 30, 1987, U.S. Pat. No. 5,149,842 (AUSIMONT SRL) Sep. 22, 1992, U.S. Pat. No. 5,258,110 (AUSIMONT SRL) Feb. 11, 1993. Preferred examples of hydroxy-terminated perfluoropolyethers are those marketed under the tradename Fomblin Z DOL®; most preferably, Fomblin Z DOL® perfluoropolyethers having molecular weight of 4000 Da or 2000 Da are used for the preparation of the compositions of the invention.

Diisocyanates of formula OCN-E-NCO are preferably selected from the followings: hexamethylendiisocyanate (HDI), trimethylhexamethylenediisocyanate, isophorone diisocyanate (IPDI), 4,4'-methylenebis(cyclohexylisocyanate) (H12-MDI), cyclohexyl-1,4-diisocyanate, 4,4'-methylenebis(phenylisocyanate) (MDI) or its isomers, toluene 2,4-diisocyanate (TDI) or isomers thereof, xylylene diisocyanate, naphthalene-1,5-diisocyanate, p-phenylenediisocyanate. According to a preferred embodiment, the diisocyanate is isophorone diisocyanate (IPDI).

Dicarboxylic acids of formula HOOC-E-COOH are preferably selected from $C_2$-$C_{20}$ alkylene dicarboxylic acids, cycloalkyl dicarboxylic acids, typically $C_3$-$C_{12}$ cycloalkyl dicarboxylic acids, like cyclohexane dicarboxylic acid, preferably 1,4-cyclohexane dicarboxylic acid, aromatic dicarboxylic acids, typically $C_5$-$C_{12}$ aromatic dicarboxylic acids like terephthalic acid and naphthalene dicarboxylic acids.

The chain extender or comonomer is preferably selected from an aliphatic diol or a (cyclo)aliphatic diamine with 2 to 14 carbon atoms. Non-limitative examples of suitable aliphatic diols notably include ethanediol, 1,4-butanediol, 1,6-hexanediol, diethylene glycol and dipropylene glycol. Non-limitative examples of suitable (cyclo)aliphatic diamines notably include isophoronediamine, ethylene diamine, 1,2-propylenediamine, 1,3-propylenediamine, N-methyl-propylene-1,3-diamine and N,N'-dimethylethylenediamine.

The chain extender or comonomer may also be selected from diamines comprising a siloxane group of formula:

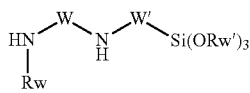

wherein:
$R_W$ and $R_{W'}$, equal to or different from each other, are independently selected from hydrogen and/or $C_1$-$C_6$ hydrocarbon groups, preferably $R_W$ being hydrogen and $R_{W'}$ being selected from $C_1$-$C_6$ hydrocarbon groups,
W and W', equal to or different from each other, represent divalent hydrocarbon group having 1 to 12 carbon atoms.

Diamines comprising a siloxane group suitable for the purpose of the invention are notably those disclosed in EP 1559733 A (SOLVAY SOLEXIS SPA) Mar. 8, 2005. Non-limitative examples of siloxane-comprising diamines are notably N-(2-aminoethyl)-3-aminopropyltrimethoxysilane of formula:

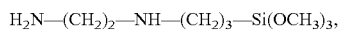

N-(2-aminoethyl)-2-aminoethyltrimethoxysilane of formula:

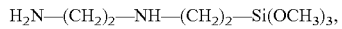

N-(3-aminopropyl)-3-aminopropyltrimethoxysilane of formula:

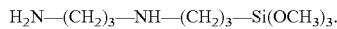

In greater detail, the synthesis of PU polymers (A) and (B) is performed, for example, by dissolving in a suitable organic solvent a hydroxy-terminated (per)fluoropolyoxyalkylene complying with formula (V) above and a diisocyanate of formula OCN-E-NCO, in which E is as defined above, in a suitable organic solvent, in the presence of a polymerization catalyst, typically dibutyltin dilaurate. Suitable organic solvents are ketones or acetates having a boiling point higher than 60° C., like methyl-ethyl-ketone and butyl acetate, partially fluorinated solvents like H-Galden® hydrofluoropolyether or hexafluoroxylene (HFX). The resulting mixture is usually heated up to a temperature ranging from 60 to 70° C. until the reaction (herein after referred to as polymerization reaction) is complete. Thereafter, a functionalized diol of formula HO—$R_H$—OH, optionally salified with a suitable salifying agent, dissolved in the same solvent as used in the polymerization reaction is added and the resulting mixture is heated again at a temperature ranging from 60 to 70° C. until the reaction (herein after referred to as extension reaction) is complete. A further chain extender of formula HO—$R_{diol}$—OH and/or of formula $H_2N$—$R_{diamine}$—$NH_2$, wherein $R_{diol}$ and $R_{diamine}$ are as defined above can be added in addition to the functionalised diol of formula HO—$R_H$—OH.

Salifying agents for the preparation of anionic polymers (A) are usually organic bases, typically amines. Examples of suitable amines are secondary or tertiary alkylamines that may contain further functional groups, such as triethylamine, diethanol amine and triethanolamine; according to a preferred embodiment, the amine is triethylamine. Inorganic bases like NaOH or KOH can also be used. An organic or inorganic base needs to be added for the synthesis of polymers (A) containing urethane moieites. Salifying agents for the preparation of cationic polymer (B) can be inorganic or organic acids; suitable organic acids are halide acids like HCl, while a preferred carboxylic acid is acetic acid.

Synthesis of Polyacrylate Polymers

Polyacrylate polymers to be used in the compositions of the present invention can be prepared by radical polimerization of a PFPE acrylate with at least one acrylate or 2-alkyl acrylate compound containing an ionisable anionic or cationic group as defined above and, optionally, a further non-ionisable acrylate derivative. In one preferred embodiment, the polymerization occurs between:

a') at least one (per)fluoropolyether complying with formula (VI) here below:

$$Z'—O—R_{OF}—Y' \qquad (VI)$$

wherein:
$R_{OF}$ has the same meanings as defined above and one of Z' and Y' complies with formula:

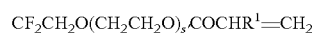

wherein s' and $R^1$ are as defined above and the other one is $CF_3$— or $CF_3CF_2$—;

b') at least one acrylate or 2-alkyl acrylate compound having formula (III) below:

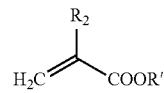

wherein R' is hydrogen or a straight or branched alkyl chain, typically a $C_1$-$C_4$ alkyl chain, or a chain of formula $(CH_2)_{m'''}$—$NR_{N1}R_{N2}$ and $R_2$ is as defined above; and, optionally c') a further non-ionizable acrylate or 2-alkyl acrylate compound having formula (IV) below:

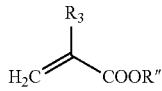
(IV)

in which $R_3$ is a $C_1$-$C_6$ straight or branched alkyl chain and R" is a $C_1$-$C_{18}$ straight or branched, saturated or unsaturated hydrocarbon chain in the presence of a radical polymerization initiator.

When a compound of formula (III) in which R' is a straight or branched alkyl chain is used, the reaction product between perfluoropolyether (IV) and compound (III) is submitted to hydrolysis of the ester group according to reactions known in the art.

The present invention will be now described in greater detail in the following experimental section.

Should the disclosure of any patents, patent applications, and publications which are incorporated herein by reference conflict with the description of the present application to the extent that it may render a term unclear, the present description shall take precedence.

EXPERIMENTAL SECTION

Materials and Methods

Materials

Isophorone diisocyanate (IPDI), dibutyltindilaurate (DBTDL), methy-ethylketone (MEK), hexafluoroxylene (HFX), triethylamine (TEA), dimethylolpropionic acid (DMPA), 1,2-propandiol (1,2-PD), neopenthylglycole, diethylamine-propanediol (DEAPD), acetic acid, ethyl acetate (AcOEt), isopropanol (IPA), Imicure® EMI-24, tetraethylorthosilicate (TEOS) were purchased from Aldrich® and used as received. Dynasylan® Glymo, was purchased from Evonik Degussa GmbH and used as received.

Fomblin ZDOL® PFPE: $HOCH_2CF_2(OCF_2CF_2O)_m(CF_2O)_nCF_2CH_2OH$ (m/n=2.0; MW 4000 and 2000) from Solvay Specialty Polymers.

Hydrofluoroethers Novec® HFE 7200 and HFE 7500 from 3M have been used as received.

Methods

Potentiometric Titration of Chloride Ions (Washing Water of Acid Polyurethane)

Sample: 10 g (exactly weighed)
Solvent: water
Titrating agent: $AgNO_3$ 0.1 N
Electrode: DM141SC Mettler Toledo
Analytical Procedure for Acid Polyurethane
Sample: 1-3 g (exactly weighed)
Solvent: HFX/IPA 50/10 (ml)
Titrating agent: tetramethylammonium hydroxide TMAI 0.1M in $CH_3OH$
Electrode: DG115SC Mettler Toledo
Analytical Procedure for Basic Polyurethane
Sample: 1-3 g (exactly weighed)
Solvent: HFX/IPA 50/10 (ml)
Titrating agent: HCl 0.1M in IPA
Electrode: DG115SC Mettler Toledo
Kinematic Viscosity Kinematic viscosity was determined according to ASTM D445 by measuring the time for a volume of composition sample to flow under gravity through a calibrated glass capillary Kannon-Fenske Routine viscometer immersed in a thermostatic bath set at 20° C.

Contact Angle $q_M$ (°) at time zero
Solvent: $H_2O$ MilliQ—q (°) average value on 10 drops
Deposition of the samples (2 ml): automatic mode—speed 0.5 ml/s Hardness Shore A 3"—DIN53504 S2
cross velocity 200 mm/min.

Cross-Cut Test

The Elcometer Cross Hatch Cutter is a simple but effective instrument for assessing the adhesion or resistance to separation of coatings from substrates. It can be used in accordance with the following International Standards: AS 1580.408.4, AS 3894.9, ASTM D3359-B, EN 13523-6 (superseding ECCA T6), ISO 2409 (superseding BS 3900-E6 & NF T30-038), ISO 16276-2 and JIS K 5600-5-6. The coated supports under examination were notched using and Elcometer 1542 Cross Hatch Cutter to form a grid, then an adhesive tape selected in accordance with the afore-mentioned ASTM method was applied and removed. Thereafter, the number of squares remained on the support was counted and expressed as percentage (reported as 100/100 in Tables 1 and 3).

Scratch-Test

Circular scratches were made with a tip on the sample under examination. The tip material was driven on the sample surface with a known and constant load, which was progressively increased (double range: from 0.1-1 N to 1-10N). Table 2 reports the load which corresponds to the formation of a scratch on the surface (visual inspection). After 24 hours and 2 weeks at room temperature and without any treatment of the sample, the sample was inspected in order to establish whether self-repairing had occurred. If the sample was still damaged, the load corresponding to the remaining damage was recorded.

Due to the fact that in some cases no scratch was observed on the samples at a load as high as 10N, four overlapping circular scratches were made at a load of 10 N, then self-repairing was evaluated as explained above.

Solvent Rub Test—MEK (Referred to as DR Mek in the Tables)

Solvent resistance was evaluated by means of the Solvent Rub Test according to ASTM D4752 and NCCA 11-18. This test method is used to determine the degree of cure of a baked film by the film resistance to a specified solvent. The test is usually performed using methyl ethyl ketone (MEK) as the solvent. The MEK resistance or degree of cure applies to paint topcoats and primers. ASTM D4752 envisages rubbing the surface of a baked film with a cheesecloth soaked with MEK until failure or break of the film occurs. The type of cheesecloth, the stroke distance, the stroke rate, and the approximate applied pressure of each rub are specified. Rubs were counted as double rubs (one rub forward and one rub backward constitutes a double rub). The test was stopped when damage of the coating is observed or at a limit value of 200 double rubs (DR). The data are reported in Tables 1 and 3 below.

Spot Tests

Drops of solvents, acids or basis were deposited onto the samples (coatings); after evaporation the samples were visually inspected to verify whether marks or sings of damage had formed. The data are reported in Tables 5 and 6.

Preparation of Acid and Basic Polyurethanes

Preparation 1-Acid Polyurethane from Fomblin® Z DOL PFPE MW 4000 Containing 0.2 eq/kg of Acid Groups (PU-A1)

Step 1): Preparation of the Prepolymer

A glass reactor was charged with IPDI (22.57, 204 meq), Fomblin Z DOL® perfluoropolyether MW 4000 (200 g, 102 meq) and AcOEt (20 g). The reaction mass was warmed up to 50° C., under mechanical stirring, then dibutyltin dilaurate (DBTDL, 0.43 ml, 5% solution in AcOEt) was added; a spontaneous increase of the internal temperature to 55° C. was observed. Thereafter, the temperature was increased to 65° C. and kept at this value for two hours. The completion of the reaction was monitored by $^{19}$F-NMR.

Step 2: Chain-Extension

The internal temperature of the reaction mass from step 1) was lowered to 50° C. and a solution of dimethylol propionic acid (DMPA, 6.8 g, 102 meq), salified with an equivalent ratio of triethylamine (TEA, 4.10 g) in AcOEt (50 ml) was added dropwise. Then the temperature was increased again to 65° C. and the completion of the reaction was monitored by IR, until disappearance of the typical —NCO band (2225 cm$^{-1}$).

Step 3: Acidification, Washings and Drying

The reaction mixture from step 2 was cooled to room temperature, then Novec® HFE 7200 (750 g) and isopropanol (250 g) were added under stirring. After obtainment of a clear solution, 37% HCl was added dropwise until the pH became acid. After 10 minutes under mechanical stirring, demineralised water was added (500 g) and the mixture was transferred into a separatory funnel. The aqueous phase was discharged, then the organic phase was washed with water until complete removal of chloride ions in the washing water (analytical control by titration according to method 1). The organic phase was dried and the acid polyurethane PU 5060 was obtained (233.5 g). The acid content (measured by titration according to method 2) was 0.20 eq/kg.

Preparation 2-Acid Polyurethane from Fomblin® Z DOL PFPE MW 2000 Containing 0.2 eq/kg of Acid Groups (PU-A2)

An acid polyurethane containing 0.2 eq/kg of acid groups was prepared from Fomblin Z DOL® perfluoropolyether having a MW of 2000 following the same procedure as in Preparation 1, using the reagents and solvents indicated below:

IPDI (46.07 g, 415 meq)
Fomblin Z DOL® perfluoropolyether MW 2000 (200 g, 207 meq)
AcOEt (25 g)
dibutyltin dilaurate (DBTDL, 0.20 ml, 5% solution in AcOEt)
In the chain extension:
Dimethylol propionic acid (DMPA, 6.94 g, 103.6 meq)
Neopenthylglycole (5.39 g, 103.6 meq)
Triethylamine (TEA 4, 19 g) in AcOEt (50 g)
In the acidification, washing and drying step:
Novec® HFE 7200 (750 g)
Isopropanol (250 g)
HCl 37% (added dropwise until acid pH)
demineralised water (500 g)
Final yield: 255 g.
Acid content (measured by titration according to method 2): 0.2 eq/Kg.

Preparation 3-Acid Polyurethane from Fomblin® Z DOL PFPE MW 4000 Containing 0.1 eq/kg of Acid Groups (PU-A3)

An acid polyurethane from Fomblin® Z DOL PFPE MW 4000 containing 0.1 Eq/Kg of acid groups was prepared following the same procedure as in Preparation 1, using the reagents and solvents indicated below.

In the preparation of the prepolymer:
IPDI (11.28 g, 102 meq)
Fomblin Z DOL® perfluoropolyether MW 4000 (100 g, 50 meq)
AcOEt (10 g)
dibutyltin dilaurate (DBTDL, 0.20 ml, 5% solution in AcOEt)
In the chain extension:
Dimethylol propionic acid (DMPA, 1.7 g, 25 meq)
Neopenthylglycole (1.32 g, 25 meq)
Triethylamine (TEA, 1.03 g) in AcOEt (25 ml)
In the acidification, washing and drying step:
Novec® HFE 7200 (340 g)
Isopropanol (114 g)
HCl 37% (added dropwise until acid pH)
demineralised water (230 g)
Final yield: 114 g.
Acid content (measured by titration according to method 2): 0.10 eq/Kg.

Preparation 4-Acid Polyurethane from Fomblin® Z DOL PFPE MW 2000 Containing 0.35 eq/kg of Acid Groups (PU-A4)

An acid polyurethane from Fomblin® Z DOL PFPE MW 2000 containing 0.35 eq/kg of acid groups was prepared following the same procedure as in Preparation 1 using the reagents and solvents indicated below.

In the preparation of the prepolymer:
IPDI (39 g, 351 meq)
Fomblin Z DOL® perfluoropolyether MW 2000 (200 g, 175 meq)
AcOEt (25 g)
dibutyltin dilaurate (DBTDL, 0.78 ml, 5% sol in AcOEt)
In the chain extension:
Dimethylol propionic acid (DMPA 11.75 g, 175 meq)
Triethylamine (TEA, 7.09 g) in AcOEt (55 ml)
In the acidification, washing and drying step:
Novec® HFE 7200 (754.5 g)
Isopropanol (251 g)
HCl 37% (added dropwise until acid pH)
demineralised water (500 g)
Final yield: 251 g
Acid content (measured by titration, according to method 2): 0.34 eq/Kg.

Preparation 5-Basic Polyurethane from Fomblin® Z DOL PFPE MW 4000 Containing 0.2 eq/kg of Amino Groups (PU-B1)

Step 1-Preparation of the Prepolymer

A glass reactor was charged with IPDI (11.28 g, 102 meq), Fomblin Z DOL® perfluoropolyether with MW 4000 (100 g, 50 meq) and ethyl acetate (10 g). The reaction mass was warmed up to 50° C. under mechanical stirring, then DBTDL (0.23 ml, 5% solution in AcOEt) was added. A spontaneous increase of the internal temperature to 55° C. was observed. Thereafter, the temperature was increased to 65° C. and kept at this value for two hours.

The completion of the reaction was monitored by $^{19}$F-NMR.

Step 2-Chain-Extension

The internal temperature or the reaction mixture from step 1 was lowered to 50° C. and 25 ml ethyl acetate was added.

The temperature was increased again to 65° C. and DEAPD (3.73 g, 50 meq) was added dropwise as a diluted solution in ethyl acetate.

The completion of the reaction was monitored by IR, until disappearance of the typical —NCO band (2225 cm$^{-1}$).

The organic phase then was dried and the title polyurethane was obtained (115 g). The amine content, measured by titration (see method 3), was 0.20 eq/kg.

Preparation 6-Basic Polyurethane from Fomblin® Z DOL PFPE MW 2000 Containing 0.2 eq/kg of Amino Groups (PU-B2)

A basic polyurethane containing 0.2 eq/kg of amino groups was prepared following procedure 5 starting from Fomblin® Z DOL perfluoropolyether having a MW of 2000, using the reagents and solvents indicated below.

In the preparation of the prepolymer:
IPDI (23 g, 207 meq)
Fomblin Z DOL® perfluoropolyether MW 2000 (100 g, 104 meq)
ethyl acetate (20 g)
DBTDL (0.48 ml, 5% solution in AcOEt)
In the chain extension:
ethyl acetate: 20 ml;
1,2-PD (1.97 g, 52 meq)
DEAPD (3.81 g, 52 meq) as diluted solution in ethyl acetate.
Final yield: 128.9 g
Amino groups content (measured by titration according to method 3): 0.20 eq/kg.

Preparation 7-Basic Polyurethane Containing 0.1 eq/kg Amino Groups from Fomblin® Z DOL PFPE MW 4000 (PU-B3)

A basic polyurethane containing 0.1 eq/kg amino groups was prepared from Fomblin® Z DOL PFPE MW 4000 following procedure 5, using the reagents and solvents indicated below.

In the preparation of the prepolymer:
IPDI (11.28 g, 102 meq)
Fomblin Z DOL® perfluoropolyether MW 4000 (100 g, 50 meq)
ethyl acetate (15 g)
DBTDL (0.23 ml, 5% solution in AcOEt)
In the chain extension:
ethyl acetate: 15 ml
1,2-PD (0.96 g, 25 meq)
DEAPD (1.87 g, 25 meq) as diluted solution in ethyl acetate.
Yield: 114 g
Amino groups content (measured by titration, method 3): 0.10 eq/kg.

Preparation of Compositions and Coatings

Example 1—Preparation of Composition and Coating 1

PU-A2 from preparation 2 (6 g) and PU-B2 from preparation 6 (6 g) were dissolved at 30° C. in 48 g of a mixture of Novec® HFE 7500 and Isopropanol (10:1 w/w), obtaining Composition 1 as a clear and homogeneous dispersion (concentration 20% w/w; kinematic viscosity at 20° C. 264 cSt). Aliquots of Composition 1 were tape-casted on different supports (glass and Al); after drying (1 h at room temperature, 2 h at 110° C.), coatings were obtained having a thickness in the range 20-30 microns. (Shore A 3": 81—Contact angle vs. H$_2$O: 114.2°; vs. n-C$_{12}$: 64.3°. )

Example 2—Preparation of Composition and Coating 2

Composition and Coating 2 were prepared following the same procedure as in example 1, using 4 g of PU-A1 from Preparation 1 and 8 g of PU-B3 from Preparation 7. The kinematic viscosity of Composition 2 at 20° C. (concentration 20% w/w) was 273 cSt.
Properties of Coating 2:
Shore A 3": 54
Contact angle: vs. H$_2$O: 118.3°; vs. n-C$_{12}$: 66.4°

Example 3—Preparation of Composition and Coating 3

Composition and Coating 3 were prepared following the same procedure as in Example 1, using PU-A1 (6 g) from Preparation 1 and PU-B1 (6 g) from Preparation 5. The kinematic viscosity of Composition 3 (concentration 20% w/w) at 20° C. was 1163 cSt.
Properties of coating 3:
Shore A 3": 60
Contact angle: vs. H$_2$O: 116°; vs. n-C$_{12}$: 65.2°.

Example 4—Preparation of Composition and Coating 4

Composition and Coating 4 were prepared following the same procedure as in Example 1, using PU-A2 (9.6 g) from Preparation 2 and PU-B2 (4.8 g) from Preparation 6. 57.6 g of a mixture of Novec® HFE 7500 and Isopropanol (10:1 w/w) was used for the preparation of the Composition (20% w/w).
The kinematic viscosity of Composition 4 at 20° C. was 179 cSt.

Example 4A—Preparation of Composition and Coating 4A

Composition 4 prepared according to Example 4 (22 g) was mixed with Dynasylan® Glymo (3-glycidyloxypropyl trimethoxysilane, 0.077 g) and Imicure® EMI-24 (2-ethyl-4-methyl imidazole—0.36 mL of a 0.5% w/V isopropanol solution) under stirring at 30° C., thereby obtaining a clear and homogeneous dispersion (Composition 4A). Aliquots of Composition 4A were tape-casted on different supports (glass and Al) and after drying (3 h at room temperature, 1 h at 80° C. in wet atmosphere, 2 h at 110° C.)
Coatings having a 20-30 micron thickness were obtained.

Example 5—Preparation of Composition and Coating 5

Composition and Coating 5 were prepared following the same procedure as in Example 1, using PU-A3 (7.9 g) from Preparation 3 and PU-B3 prepared from Preparation 7. 57.6 g of a mixture of Novec® HFE 7500 and Isopropanol (10:1 w/w) was used for the preparation of the Composition (20% w/w dispersion).
The kinematic viscosity of Composition 5 at 20° C. was 104 cSt.

Example 5A—Preparation of Composition and Coating 5A

Composition and Coating 5A were prepared from 40 g of Composition 5 following the same procedure as in Example 4A, with the difference that 0.066 g Dynasylan® Glymo and Imicure® EMI-24 (0.31 ml of a 0.5% w/V isopropanol solution) were used in the preparation of Composition 5A.

Example 6—Preparation of Composition and Coating 6

Composition and coatings 6 were prepared following the same procedure as in Example 1, using PU-A4 (5 g) from Preparation 4 and PU-B1 (3.28 g) from Preparation 5, 37.6 g of a mixture of Novec® HFE 7500 and isopropanol (10:1 w/w) was used for the preparation of Composition 6. The kinematic viscosity of Composition 6 at 20° C. was 681 cSt.

Example 6A—Preparation of Composition and Coating 6A

Composition and Coating 6A were prepared from 23 g of Composition 6, following the same procedure as in Example 4A, with the difference that 0.08 g Dynasylan® Glymo and Imicure® EMI-24 (0.33 mL of a 0.5% w/V isopropanol solution) were used for the preparation of Composition 6A.

Example 7—Preparation of Composition and Coating 7

Composition and coating 7 were prepared following the same procedure as in Example 1, using PU-A4 (6 g) from Preparation 4 and PU-B2 (5.25 g) from Preparation 6. 45 g of a mixture of Novec® HFE 7500 and isopropanol (10:1 w/w) was used for the preparation of Composition 7. The kinematic viscosity of Composition 7 at 20° C. was 284 cSt.

Example 7A—Preparation of Composition and Coating 7A

Composition and Coating 7A were prepared from 40 g of Composition 7, following the same procedure as in Example 4A, with the difference that 0.17 g Dynasylan® Glymo and 0.79 ml of an Imicure® EMI-24 solution (0.5% w/V in isopropanol) were used for the preparation of Composition 7A.

Preparation of Composition and Coating 8A

Composition and Coating 8A were prepared from 29 g Composition 8, following the same procedure as in Example 4A, with the difference that 0.23 g Dynasylan® Glymo and and 0.11 ml of an Imicure® EMI-24 solution (5% w/V in isopropanol) was used for the preparation of Composition 8A.

Preparation of Composition and Coating 8A

Composition and Coating 8A were prepared from 29 g Composition 8, following the same procedure as in Example 4A, with the difference that 0.23 g Dynasilan Glymo® and 0.047 ml Imicure® EMI-24 was used for the preparation of Composition 8A.

Example 9—Preparation of Composition and Coating 9

Composition and Coating 9 were prepared following the same procedure as in Example 1, using 6 g PU-A4 from Preparation 4 and 5.25 g PU-B1 from Preparation 5. 45 g of a mixture of Novec® HFE 7500 and isopropanol (10:1 w/w) was used for the preparation of Composition 9. The kinematic viscosity of Composition 9 at 20° C. was 741 cSt.

Example 9A—Preparation of Composition and Coating 9A

Composition and Coating 9A were prepared from 35.8 g of Composition 9, following the same procedure as in Example 4A, with the difference that 0.15 g Dynasylan® Glymo and 0.70 ml of an Imicure® EMI-24 solution (0.5% w/V in isopropanol) was used for the preparation of Composition 9A.

Example 10—Preparation of Composition and Coating 10

Composition and Coating 10 were prepared following the same procedure as in Example 1, using 4 g PU-A1 form Preparation 1 and 5 g PU-B1 from Preparation 5. 36 g of a mixture of Novec® HFE 7500 and isopropanol (10:1 w/w) was used for the preparation of Composition 10. The kinematic viscosity of Composition 10 at 20° C. was 791 cSt.

Example 10A—Preparation of Composition and Coating 10A

Composition and Coating 10A were prepared from 22.5 g of Composition 10, following the same procedure as in Example 4A, with the difference that 0.024 g Dynasylan® Glymo was used in the preparation of Composition 10A—.

Example 11—Preparation of Composition and Coating 11

Composition and Coating 11 were prepared following the same procedure as in Example 1, using 4 g PU-A2 from Preparation 4 and 5 g PU-B2 from Preparation 7. 36 g of a mixture of Novec® HFE 7500 and isopropanol (10:1 w/w) was used for the preparation of Composition 11. The kinematic viscosity of Composition 10 at 20° C. was 302 cSt.

Example 11A—Preparation of Composition and Coating 11A

Composition and Coating 11A were prepared from 22.5 g of Composition 10, following the same procedure as in Example 4A, with the difference that 0.024 g Dynasylan® Glymo was used in the preparation of Composition 11A.

Example 12—Preparation of Composition and Coating 12

Composition and Coating 12 were prepared using 22.5 g of Composition 10A after the reaction step at 80° C. (2 h). Afterward cooling at room temperature TEOS (0.016 g) was added. The mixture was maintained 30 minutes under stirring at room temperature. Then aliquots of Composition 12 were tape-casted on different supports (glass and Al) and after drying (3 h at room temperature, 3 h at 80° C. in wet atmosphere, 2 h at 110° C.), coatings having a 20-30 micron thickness were obtained.

Evaluation of the Compositions

Tests 1 and 2-Cross Cut Test and Double Rub Test on Glass Support

The cross cut test and the double rub tests were carried out as described in the section "Methods", using a glass support sized 10×10 cm with a 0.2 cm average thickness as support.

The fluorinated coating thickness ranged between 20 and 30 µm. The results are reported in Table 1 below. In the table, "Nd" stands for "not detected".

TABLE 1

| Composition | Cross cut test (percentage of squares remained on the glass support) | Double rub (DR) test with MEK |
|---|---|---|
| 1 | 100% | 1 DR |
| 2 | 100% | 1 DR |
| 3 | 100% | 4 DR |
| 4 | 100% | 2 DR |
| 4A | 100% | 5 DR |
| 5 | 100% | 1 DR |
| 5A | 100% | 3 DR |
| 6 | 100% | Nd |
| 6A | 100% | 30 DR |
| 7 | 100% | Nd |
| 7A | 100% | Nd |
| 8 | 100% | Nd |
| 8A | 100% | Nd |
| 9 | 100% | Nd |
| 9A | 100% | 10 DR |
| 10 | 100% | Nd |
| 10A | 100% | 42 DR |
| 11 | 100% | Nd |
| 11A | 100% | 2 DR |
| 12 | 100% | 60 DR |

Test 3-Scratch Test on Glass Supports

The scratch test on glass supports was performed as described in the section Methods above. The results are reported in Table 2 below. In the table, "cs" stands for "circular scratches".

TABLE 2

| Composition | Scratch Test Time = 0 | Scratch Test Time = 24 h | Scratch Test Time = 14 days |
|---|---|---|---|
| 1 | 3N | 8N | 9N |
| 2 | 6N | 8N | 10N × 4 cs |
| 3 | 7N | 7N | 8N |
| 4 | 5N | 10N | 10N |
| 4A | 5N | Repaired | Repaired |
| 5 | 7N | 9N | 10N × 4 cs |
| 5A | 7N | 10N × 4 cs | 10N × 4 cs |
| 6 | 7N | 9N | 9N |
| 6A | 10N × 4 cs | 10N × 4 cs | 10N × 4 cs |
| 7 | 5N | 6N | 7N |
| 7A | 5N | 10N × 4 cs | 10N × 4 cs |
| 8 | 6N | 8N | 10N × 4 cs |
| 8A | 8N | 9N | 10N × 4 cs |
| 9 | 7N | 8N | 9N |
| 9A | 10N × 4 cs | Partially repaired | Partially repaired |
| 10 | 10N × 4 cs | 10N × 4 cs | 10N × 4 cs |
| 10A | 9N | 9N | 9N |
| 11 | 6N | 9N | 9N |
| 11A | 7N | Partially repaired | Partially repaired |
| 12 | 10N × 4 cs | Repaired | Repaired |

Tests 4 and 5-Cross-Cut Test and Double Rub Test on Al Q Panel Support

The cross cut test and the double rub tests were carried out as described in the section "Methods", using a Q Panel (aluminium plate sized 7×15 cm with average thickness of 0.6 mm). The fluorinated coating thickness ranged between 20 and 30 µm.

TABLE 3

| Composition | Cross Cut | DR MEK |
|---|---|---|
| 1 | 100/100 | 1 DR |
| 2 | 100/100 | 2 DR |
| 3 | 100/100 | 4 DR |
| 4 | 100/100 | 2 DR |
| 4A | 100/100 | 30 DR |
| 5 | 100/100 | 1 DR |
| 5A | 100/100 | 5 DR |
| 6 | 100/100 | 6 DR |
| 6A | 100/100 | 70 DR |
| 7 | 100/100 | 1 DR |
| 7A | 100/100 | 40 DR |
| 8 | 100/100 | 1 DR |
| 8A | 100/100 | 160 DR |
| 9 | 100/100 | 3 DR |
| 9A | 100/100 | 130 DR |
| 10 | 100/100 | 3 DR |
| 10A | 100/100 | 42 DR |
| 11 | 100/100 | 3 DR |
| 11A | 100/100 | 3 DR |
| 12 | 100/100 | 100 DR |

Test 6-Scratch Test on Aluminium Support

The scratch test on Aluminium support was carried out as described in the section Method above. The results are reported in Table 4 below. In the table, "cs" stands for "circular scratches".

TABLE 4

| Composition | Scratch Test Time = 0 | Scratch Test Time = 24 h | Scratch Test Time = 14 days |
|---|---|---|---|
| 1 | 4N | 9N | 10N × 4 cs |
| 2 | 8N | 9N | 10N × 4 cs |
| 3 | 9N | 9N | 10N |
| 4 | 6N | 10N × 4 cs | 10N × 4 cs |
| 4A | 9N | 10N × 4 cs | 10N × 4 cs |
| 5 | 7N | 9N | Repaired |
| 5A | 7N | 8N | 9N |
| 6 | 8N | 10N | 10N |
| 6A | 10N | 10N × 4 cs | 10N × 4 cs |
| 7 | 4N | 5N | 8N |
| 7A | 8N | 8N | 8N |
| 8 | 8N | 9N | 10N |
| 8A | 8N | 9N | 10N |
| 9 | 6N | 6N | 8N |
| 9A | 10N × 4 cs | 10N × 4 cs | 10N × 4 cs |
| 10 | 10N | 10N × 4 cs | 10N × 4 cs |
| 10A | 10N × 4 cs | Partially repaired | Partially repaired |
| 11 | 8N | 9N | 9N |
| 11A | 9N | Partially repaired | Partially repaired |
| 12 | 10N × 4 cs | Partially repaired | Partially repaired |

Test 7-Spot Test on Al Q-Panel

Evaluation of chemical resistance after 30' is reported in Table 5 below.

TABLE 5

| Composition | MeOH | Toluene | EtOH | Acetone | MEK | EtAc | BuAc |
|---|---|---|---|---|---|---|---|
| 4A | + | − | + | + | + | + | − |
| 5A | − | − | − | − | + | − | − |
| 6 | ++ | ++ | ++ | ++ | ++ | ++ | ++ |
| 6A | − | − | + | − | − | − | − |
| 7 | + | + | − | + | + | − | ++ |
| 7A | + | − | + | + | + | + | − |
| 8 | + | + | + | + | + | + | ++ |
| 8A | − | − | + | − | + | + | − |

TABLE 5-continued

| Composition | MeOH | Toluene | EtOH | Acetone | MEK | EtAc | BuAc |
|---|---|---|---|---|---|---|---|
| 9 | + | + | + | + | + | + | ++ |
| 9A | − | − | − | − | − | − | − |
| 10 | + | + | ++ | + | ++ | ++ | +++ |
| 10A | + | + | − | − | − | − | − |
| 11 | ++ | ++ | ++ | ++ | ++ | ++ | ++ |
| 11A | + | − | + | + | + | + | − |
| 12 | + | − | + | − | − | − | − |

Evaluation of chemical resistance after 24 hours is reported in table 6 below.

TABLE 6

| Composition | HCl 10% | H$_2$SO$_4$ 5% | NaOH 5% |
|---|---|---|---|
| 4A | − | − | − |
| 5A | − | − | − |
| 6 | + | + | − |
| 6A | − | − | − |
| 7 | +++ | + | +++ |
| 7A | − | − | − |
| 8 | +++ | + | ++ |
| 8A | − | − | + |
| 9 | +++ | + | ++ |
| 9A | − | − | − |
| 10 | + | − | − |
| 10A | ++ | − | + |
| 11 | + | + | + |
| 11A | ++ | + | ++ |
| 12 | +++ | − | − |

Rating for Tables 5 and 6:
− No effect
+ Very light shadow
++ Light shadow
+++ Film surface lightly damaged
++++ Film surface strongly damaged
+++++ Film destroyed

The invention claimed is:

1. A non-aqueous fluoropolymer composition comprising:
   a) at least one fluorinated ionisable polymer (A), which comprises recurring fluorinated blocks and recurring functional blocks, each of said recurring functional blocks comprising at least one ionisable anionic group, and wherein at least one of the said recurring functional blocks is comprised between two fluorinated blocks; and
   b) at least one fluorinated ionisable polymer (B), which comprises recurring fluorinated blocks and recurring functional blocks, each of said recurring functional blocks comprising at least one ionisable cationic group, and wherein at least one of the said recurring functional blocks is comprised between two fluorinated blocks;
   c) at least one fluorinated solvent; and
   d) at least one alcohol.

2. A non-aqueous fluoropolymer composition according to claim 1, wherein the equivalent ratio between the ionic equivalents of polymer (A) and the ionic equivalents of polymer (B) is higher or lower than 1:1.

3. A non-aqueous fluoropolymer composition according to claim 2 further comprising a cross-linking agent.

4. A process for the preparation of a non-aqueous fluoropolymer composition according to claim 1, the process comprising:

mixing at least one fluorinated ionisable polymer (A) and at least one fluorinated ionisable polymer (B) in a fluorinated solvent and alcohol.

5. A process according to claim 4 wherein polymer (A) and polymer (B) are dispersed in the fluorinated solvent and alcohol mixture in an equivalent ratio higher or lower than 1:1.

6. A process according to claim 5 wherein a cross-linking agent is also mixed with in the fluorinated solvent and alcohol.

7. A process for preparing a polymeric material, the process comprising film-casting or moulding and drying a non-aqueous fluoropolymer composition comprising:
   a) at least one fluorinated ionisable polymer (A), which comprises recurring fluorinated blocks and recurring functional blocks, each of said recurring functional blocks comprising at least one ionisable anionic group, and wherein at least one of the said recurring functional blocks is comprised between two fluorinated blocks; and
   b) at least one fluorinated ionisable polymer (B), which comprises recurring fluorinated blocks and recurring functional blocks, each of said recurring functional blocks comprising at least one ionisable cationic group, and wherein at least one of the said recurring functional blocks is comprised between two fluorinated blocks;
   c) at least one fluorinated solvent; and
   d) at least one alcohol.

8. The process of claim 7, wherein the polymeric material is film-casted or moulded into the form of a sealing agent, a gasket, a membrane, a film or a coating.

9. The process of claim 7, wherein the recurring fluorinated blocks are each independently a (per)fluoropolyether block comprising randomly distributed repeating units each independently selected from:

$$—CFXO—, \text{ wherein X is F or } CF_3; \quad (i)$$

$$—CF_2CFXO—, \text{ wherein X is F or } CF_3; \quad (ii)$$

$$—CF_2CF_2CF_2O—; \quad (iii)$$

$$—CF_2CF_2CF_2CF_2O—. \quad (iv)$$

10. The process of claim 9, wherein (per)fluoropolyether block comprises —CF$_2$O— and —CF$_2$CF$_2$O— units in a molar ratio of between 0.1 and 10.

11. The process of claim 7, wherein the recurring functional blocks comprising at least one ionisable anionic group each independently comprise:
   (a) a hydrocarbon chain that includes at least one functional group selected from —COOH, —SO$_3$H, and —OPO$_3$H$_4$, and
   (b) optionally one or more aromatic, heteroaromatic, cycloaliphatic or heterocycloaliphatic groups.

12. The process of claim 7, wherein the recurring functional blocks comprising at least one ionisable cationic group each independently comprise:
   (a) a hydrocarbon chain that includes at least one functional group selected from chain amines of formula —N(R$_N$)— and pendant amines of formula —N(R$_{N1}$)(R$_{N2}$), wherein R$_N$, R$_{N1}$ and R$_{N2}$ are each independently selected from hydrogen and hydrocarbon groups containing from 1 to 6 carbon atoms, and
   (b) optionally one or more aromatic, heteroaromatic, cycloaliphatic or heterocycloaliphatic groups.

13. The process of claim 1, wherein the recurring fluorinated blocks are each independently a (per)fluoropolyether block comprising randomly distributed repeating units each independently selected from:

$$—CFXO—, \text{ wherein X is F or } CF_3; \quad (i)$$

$$—CF_2CFXO—, \text{ wherein X is F or } CF_3; \quad (ii)$$

$$—CF_2CF_2CF_2O—; \quad (iii)$$

$$—CF_2CF_2CF_2CF_2O—. \quad (iv)$$

14. The process of claim 13, wherein (per)fluoropolyether block comprises —$CF_2O$— and —$CF_2CF_2O$— units in a molar ratio of between 0.1 and 10.

15. The process of claim 1, wherein the recurring functional blocks comprising at least one ionisable anionic group each independently comprise:

(a) a hydrocarbon chain that includes at least one functional group selected from —COOH, —$SO_3H$, and —$OPO_3H_4$, and (b) optionally one or more aromatic, heteroaromatic, cycloaliphatic or heterocycloaliphatic groups.

16. The process of claim 1, wherein the recurring functional blocks comprising at least one ionisable cationic group each independently comprise:

(a) a hydrocarbon chain that includes at least one functional group selected from chain amines of formula —$N(R_N)$— and pendant amines of formula —$N(R_{N1})(R_{N2})$, wherein $R_N$, $R_{N1}$ and $R_{N2}$ are each independently selected from hydrogen and hydrocarbon groups containing from 1 to 6 carbon atoms, and (b) optionally one or more aromatic, heteroaromatic, cycloaliphatic or heterocycloaliphatic groups.

* * * * *